United States Patent
Szafraniec

(10) Patent No.: US 7,019,839 B2
(45) Date of Patent: Mar. 28, 2006

(54) OPTICAL ANALYZER AND METHOD FOR MEASURING SPECTRAL AMPLITUDE AND PHASE OF INPUT OPTICAL SIGNALS USING HETERODYNE ARCHITECTURE

(75) Inventor: Bogdan Szafraniec, Sunnyvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 406 days.

(21) Appl. No.: 10/623,403

(22) Filed: Jul. 18, 2003

(65) Prior Publication Data

US 2005/0012934 A1 Jan. 20, 2005

(51) Int. Cl.
*G01B 9/02* (2006.01)
(52) U.S. Cl. .................. 356/484; 356/451
(58) Field of Classification Search .......... 356/484, 356/450, 451
See application file for complete search history.

(56) References Cited

U.S. PATENT DOCUMENTS

| 6,008,931 A | 12/1999 | von Helmolt et al. | |
|---|---|---|---|
| 6,160,626 A * | 12/2000 | Debeau et al. | 356/451 |
| 6,486,958 B1 * | 11/2002 | Szafraniec et al. | 356/484 |
| 2004/0251888 A1 * | 12/2004 | Baros et al. | 324/76.27 |
| 2005/0174577 A1 * | 8/2005 | Szafraniec | 356/477 |

FOREIGN PATENT DOCUMENTS

| EP | 1 195 927 A2 | 4/2002 |
|---|---|---|
| WO | WO/01/48954 A2 | 7/2001 |

* cited by examiner

*Primary Examiner*—Gregory J. Toatley, Jr.
*Assistant Examiner*—Patrick Connolly

(57) ABSTRACT

An optical analyzer and method for measuring optical properties of optical signals utilizes a heterodyne architecture to measure spectral amplitude and phase of a periodically modulated input optical signal, such as an optical signal from a periodically modulated distributed feedback (DFB) laser. The spectral amplitude and phase measurements are derived from a heterodyne signal, which is produced by combining and mixing the input optical signal and a local oscillator (LO) signal. The optical spectrum that is reconstructed from the heterodyne signal includes "inner" spectral peaks that contain phase information of the input optical signal. The inner spectral peaks may be produced by an optical or electrical mixing technique. The spectral phase of the input optical signal is recovered from the inner spectral peaks of the reconstructed optical spectrum.

30 Claims, 14 Drawing Sheets

OPTICAL ANALYZER AND METHOD FOR MEASURING SPECTRAL AMPLITUDE AND PHASE OF INPUT OPTICAL SIGNALS USING HETERODYNE ARCHITECTURE

FIELD OF THE INVENTION

The invention relates generally to optical analyzers, and more particularly to an optical analyzer and method for measuring spectral amplitude and phase of input optical signals.

BACKGROUND OF THE INVENTION

Spectral amplitude and phase measurements of optical signals are often desired to characterize the signals in the time domain. These spectral measurements allow time varying optical characteristics of the optical signals to be studied by means of the Fourier transform. An example of a time varying optical characteristic is a chirp of a modulated laser, i.e., variations of the laser optical frequency with intentionally induced intensity modulation. In addition, the spectral phase measurements can be used to learn about dispersive properties of an optical fiber or other optical materials or components. Various optical analyzers have been developed to measure the amplitude and phase of optical signals.

Some optical analyzers for measuring the phase of optical signals require optical filtering, which typically involves using an optical grating. A concern with these optical analyzers is that the resolution of an optical grating is inherently limited and is directly dependent on the size of the grating. In addition, optical gratings are generally expensive, which increases the cost of the optical analyzers.

Other optical analyzers for measuring the phase of optical signals require complex signal processing calculations, such as multi-dimensional autocorrelation or cross-correlation calculations of optical fields. A concern with these optical analyzers is that sophisticated processors are needed to perform the complex calculations to measure the phase.

In view of the above-described concerns, there is a need for an optical analyzer and method for measuring spectral phase of optical signals that does not require optical filtering or complex calculations, such as multi-dimensional autocorrelation or cross-correlation calculations.

SUMMARY OF THE INVENTION

An optical analyzer and method for measuring optical properties of optical signals utilizes a heterodyne architecture to measure spectral amplitude and phase of a periodically modulated input optical signal, such as an optical signal from a periodically modulated distributed feedback (DFB) laser. The spectral amplitude and phase measurements are derived from a heterodyne signal, which is produced by combining and mixing the input optical signal and a local oscillator (LO) signal. The optical spectrum that is reconstructed from the heterodyne signal includes "inner" spectral peaks that contain phase information of the input optical signal. The inner spectral peaks may be produced by an optical or electrical mixing technique. The spectral phase of the input optical signal is recovered from the inner spectral peaks of the reconstructed optical spectrum.

The optical analyzer and method in accordance with the invention measures spectral amplitude and spectral phase. The spectral phase is determined from the spectral phase differences between adjacent spectral peaks of the input optical signal by using the inner spectral peaks. These measurements allow reconstruction of optical signals in the time domain by means of the Fourier transform. In addition, the direct measurement of the spectral phase allows dispersive properties of optical materials or components to be studied. The spectral phase differences are derived without the use of expensive optical filtering or complex calculations, such as multi-dimensional autocorrelation or cross-correlation calculations Other aspects of the present invention will become apparent from the following detailed description, taken in conjunction with the accompanying drawings, illustrated by way of example of the principles of the invention.

DETAILED DESCRIPTION

Figure 1:
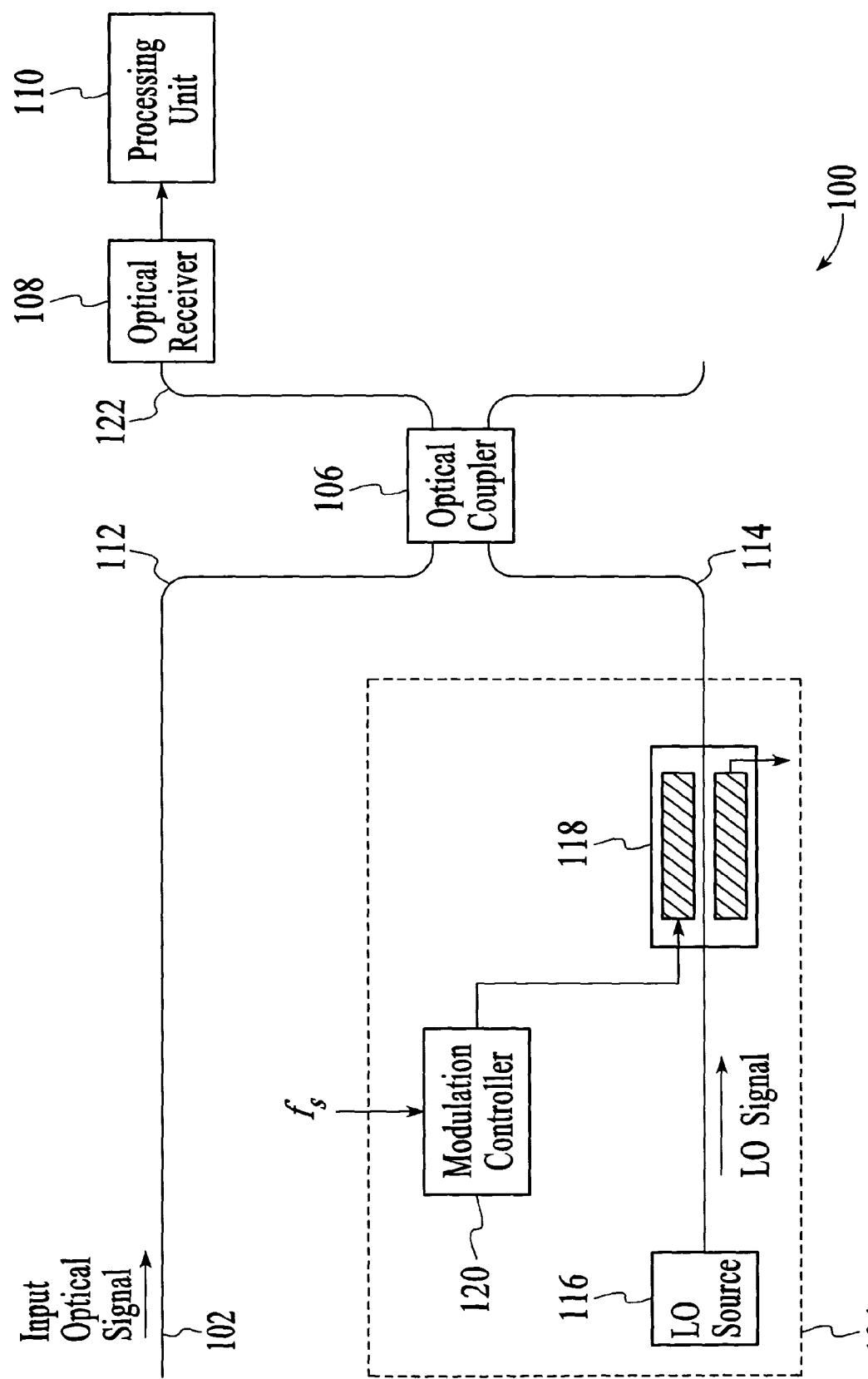
FIG. 1 is a diagram of a heterodyne optical spectrum analyzer (HOSA) system in accordance with an embodiment of the invention.

With reference to FIG. 1, a heterodyne optical spectrum analyzer (HOSA) system 100 in accordance with an embodiment of the invention is shown. The HOSA system 100 operates to measure spectral amplitude and phase of an input optical signal, such as an optical signal from a periodically modulated distributed feedback (DFB) laser or other periodically modulated optical signal, using a heterodyne architecture. The measured spectral amplitude and phase allow the HOSA system 100 to compute time-varying optical characteristics of the input optical signal, such as amplitude modulation, phase modulation and chirp by means of the Fourier transform. Since the HOSA system 100 uses an optical heterodyne architecture, expensive optical filters and complex calculations, such as multi-dimensional autocorrelation and cross-correlations calculations of optical fields, which are required in some conventional systems, are not needed.

The HOSA system 100 takes advantage of the fact that the beat of two optical signals at different frequencies contains information regarding the phase difference of the two optical signals. It is well known that two acoustic waves at different frequencies will pulse or "beat" at a frequency that is equal to the difference between the frequencies of the two acoustic waves. As an example, two acoustic waves at 30 Hertz and 34 Hertz will produce a beat frequency of 4 Hertz. The phase of the beat contains information about the phase difference between the two acoustic waves. This beat phenomena also occurs for optical signals, and thus, the beat of two optical signals at different optical frequencies contain phase information of the two optical signals. Furthermore, the phase information is preserved in a heterodyne signal, which may be produced by combining and mixing the optical signals with a swept local oscillator (LO) signal. Thus, the phase information contained in the beat of the heterodyne signal can be extracted to measure the phase difference of the optical signals. Using this fact, the HOSA system 100 measures the phase differences between spectral peaks of a periodically modulated input optical signal by analyzing a heterodyne signal produced by combining and mixing the input optical signal with a phase modulated LO signal, as described in detail below.

Figure 2:
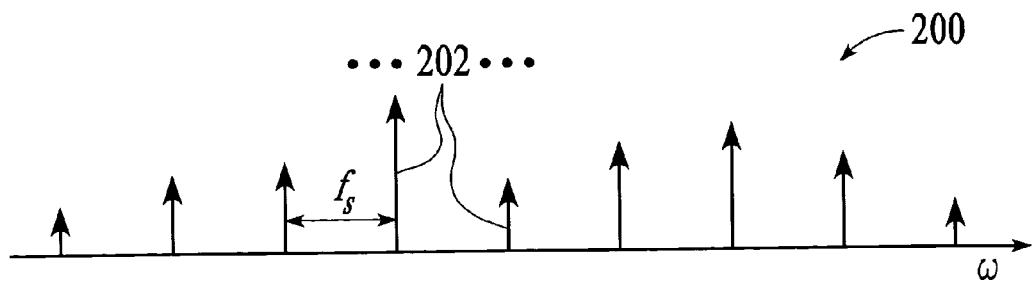
FIG. 2 is an exemplary optical amplitude spectrum of a periodically modulated input optical signal.

As shown in FIG. 1, the HOSA system 100 includes an input 102, a modulated LO 104, an optical coupler 106, an optical receiver 108 and a processing unit 110. A periodically modulated input optical signal to be analyzed is received at the input 102. The input optical signal may be from an optical device, such as a DFB laser that is modulated using a predefined frequency $f_s$, and, therefore, whose spectrum comprises multiple spectral peaks separated by $f_s$. Alternatively, the input optical signal may be from an optical fiber, which is carrying the periodically modulated optical signal. The modulation frequency $f_s$ can be recovered from the input signal. Thus, it is assumed that the frequency of modulation $f_s$, which is equal to the separation between the spectral peaks, is known. An exemplary optical amplitude spectrum 200 of the input optical signal is illustrated in FIG. 2. The optical amplitude spectrum 200 of the input optical signal includes peaks 202 separated by a frequency interval $f_s$ equal to the modulating frequency. In FIG. 1, the input 102 is connected to the optical coupler 106 via an optical path 112 to transmit the received input optical signal to the optical coupler.

Figure 3:
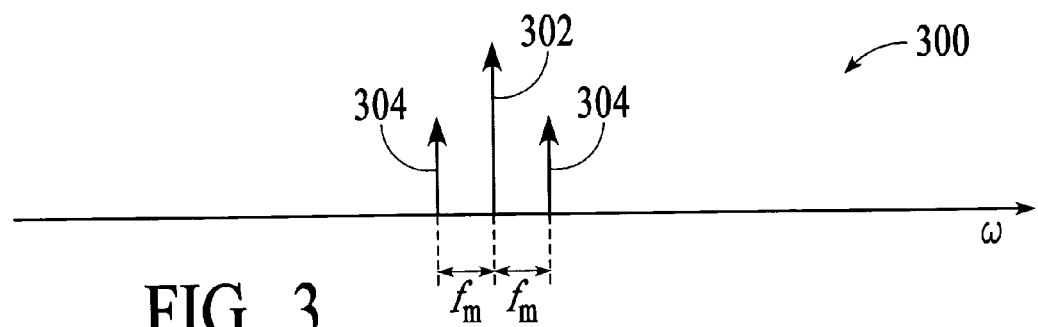
FIG. 3 is an exemplary optical amplitude spectrum of a phase modulated local oscillator (LO) signal.

The modulated LO 104 is also connected to the optical coupler 106 via an optical path 114. The modulated LO signal generated by the modulated LO 104 has at least one sideband peak created by modulation. As shown in FIG. 1, the modulated LO 104 includes an unmodulated LO source 116, an optical modulator 118, and a modulation controller 120. The unmodulated LO source 116 is described herein as a swept LO source. However, the LO source 116 may be another type of LO source that can change the frequency of the generated LO signal. Similarly, the optical modulator 118 is described herein as a phase modulator. However, the optical modulator 118 may be an intensity modulator. The LO source 116 generates a swept LO signal, which is, for example, phase modulated at a frequency of $f_m$ by the optical modulator 118. The optical modulator 118 is controlled by the modulation controller 120, which provides an electrical phase modulation signal having a frequency of $f_m$. The frequency of $f_m$ is typically related to the separation between the optical spectral peaks of the input optical signal equal to $f_s$. As an example, the frequency of $f_m$ may be half the frequency separation $f_s$ between the optical spectral peaks of the input optical signal, or a multiple integer of half the frequency separation $f_s$. The electrical signal at the frequency $f_s$ may be supplied to the modulation controller 120 from an external source. As an example, the optical modulator 118 may be a Ti-indiffused LiNbO$_3$ phase modulator. An exemplary optical amplitude spectrum 300 of the phase modulated LO signal is illustrated in FIG. 3. The optical amplitude spectrum 300 of the phase modulated LO signal includes a central peak 302 at the carrier frequency and multiple sideband peaks 304 separated from the carrier by multiples of $f_m$. Preferably, the modulation depth (defined below in the equation (1)) of the LO signal is small so that the central peak 302 and the nearest sideband peaks 304 are substantially larger than other (higher order) sideband peaks (not shown).

Turning back to FIG. 1, the optical coupler 106 is further connected to the optical receiver 108 via an output optical path 122. The input optical signal and the phase modulated LO signal on the optical paths 112 and 114, respectively, are combined at the optical coupler 106 and transmitted to the optical receiver 108 on the output optical path 122. The combined optical signals are then detected by the optical receiver 108, which may be a square-law detector. The square-law detection leads to mixing of the combined optical signals and produces a heterodyne signal having a frequency in radio frequency (RF) range, which is equal to the frequency difference of the combined signals. When a modulated LO having multiple sideband peaks is used, there may be more than one heterodyne signal. Dual heterodyne signals produce a beat whose AM demodulation provides a signal for a recovery of the spectral phase of the input optical signal. The optical receiver 108 also converts the detected optical signals into an electrical signal, i.e., current or voltage, which is processed by the processing unit 110 to measure desired optical characteristics of the periodically modulated input optical signal, such as amplitude and phase in the time domain. Although the components of the processing unit 110 are later shown and described as hardware components, the components of the processing unit 110 may be implemented in any combination of hardware, software and firmware.

The problem of measuring the phase of the periodically modulated input signal from the heterodyne signal is now presented in the following mathematical description. The electric field of the optical wave from the LO source 116 is sinusoidally modulated by the phase modulator 118 at the frequency $f_m$. The phase of the electrical modulation signal applied to the optical modulator 118, $\psi$, is controlled by the modulation controller 120 using, for example, a variable delay line. The phase modulated LO signal is described by:

$$e_0(t) = a_0 e^{j2\pi\nu_0 t + j\alpha \cos(2\pi f_m t + \psi) + j\phi_0}, \quad (1)$$

where $a_0$ is the amplitude of the electric field, $\nu_0$ is the optical frequency of the LO signal, which is typically a swept frequency (i.e., $\nu_0 = \nu_0(t)$), $\phi_0$ is the phase term that also denotes the phase noise (i.e., $\phi_0 = \phi_0(t)$), $\alpha$ is the modulation depth, and $f_m$ is the frequency of the phase modulation. The sinusoidal modulation of the LO signal produces multiple spectral peaks whose amplitude and frequency can be determined from the series expansion:

$$e^{j\alpha\cos\xi} = \sum_{n=-\infty}^{\infty} j^n J_n(\alpha) e^{jn\xi}, \quad (2)$$

where $J_n(a)$ are Bessel functions.

Figure 4:
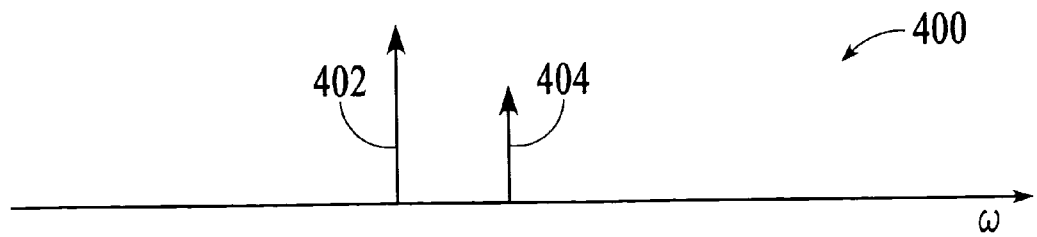
FIG. 4 is a simplified spectrum of a periodically modulated input optical signal.

In order to simplify the mathematical analysis, a spectrum under test 400 comprising just two peaks 402 and 404 is considered, as shown in FIG. 4, rather than the entire spectrum of the periodically modulated input signal, which includes many peaks, as illustrated in FIG. 2. The two peaks 402 and 404 of the spectrum 400 have optical frequencies $\nu_1$ and $\nu_2$, amplitudes $a_1$ and $a_2$, and phases $\phi_1$ and $\phi_2$, respectively. Both spectral peaks 402 and 404 are assumed to have the same phase noise, which is represented by $\phi_n$. Thus, the electrical field of the optical input signal is described by:

$$e_s(t) = a_1 e^{j2\pi\nu_1 t + j\phi_1 + j\phi_n} + a_2 e^{j2\pi\nu_2 t + j\phi_2 + j\phi_n}. \quad (3)$$

The objective is to measure the phase difference $\Delta\phi = \phi_2 - \phi_1$ to determine the relative phase between the two peaks 402 and 404.

The combined optical waves of the periodically modulated input signal and the phase modulated LO signal can be represented by the sum:

$$e(t) = e_0(t) + e_s(t). \quad (4)$$

In the equation (4), the coupling coefficients and phase shift of the optical coupler 106 are omitted to provide a more lucid description. The intensity, i, at the optical receiver 108 is equal to $e \cdot e^*$, and thus, can be expressed as:

$$i = a_0^2 + a_1^2 a_2^2 + 2a_1 a_2 \cos(2\pi\nu_1 t - 2\pi\nu_2 t + \phi_1 - \phi_2) + 2a_0 a_1 \cos(2\pi\nu_1 t - 2\pi\nu_0 t - \alpha \cos(2\pi f_m t + \psi) - \phi_0 + \phi_n) + 2a_0 a_2 \cos(2\pi\nu_2 t - 2\pi\nu_0 t - \alpha \cos(2\pi f_m t + \psi) - \phi_0 + \phi_n). \quad (5)$$

The terms of interest in the equation (5) are the last two "mixing" terms, which are the terms that are derived from the mixing of the periodically modulated input signal and the phase modulated LO signal. The significance of these "mixing" terms is now described.

Figure 5C:
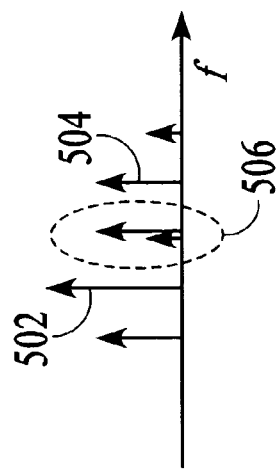
FIGS. 5A, 5B and 5C illustrate the mixing of the input optical signal and the phase modulated LO signal to produce a heterodyne signal with inner peaks.
Figure 5B:
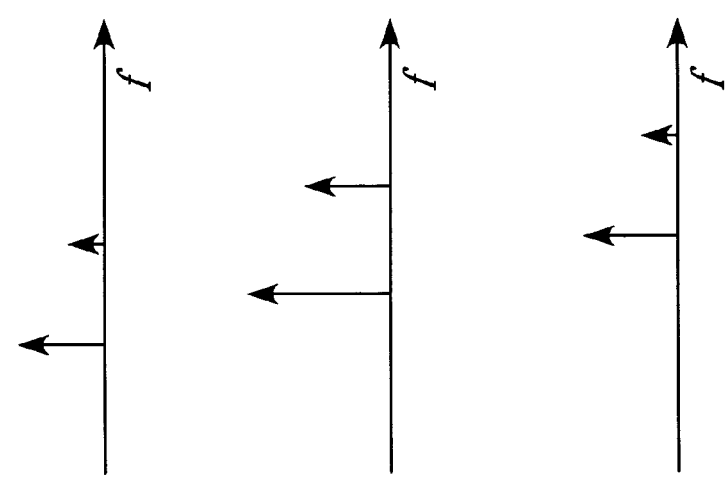
Figure 5A:
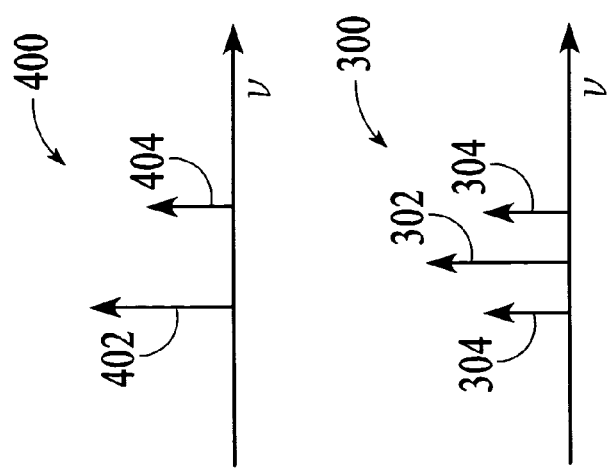

FIGS. 5A, 5B and 5C illustrate the combining and mixing of the periodically modulated input signal and the phase modulated LO signal to produce the heterodyne signal and the related optical spectrum. In FIG. 5A, the original spectrum 400 of the input optical signal and the original spectrum 300 of the LO signal are shown. The phase modulated LO signal, which is typically a swept LO signal, is assumed to comprise only the carrier peak 302 and the two nearest sideband peaks 304. Each peak of the phase modulated LO signal creates its own image of the original input spectrum at the RF, as illustrated in FIG. 5B. The spectra from FIG. 5B are combined into a reconstructed RF spectrum 500 shown in FIG. 5C. The reconstructed spectrum 500 includes peaks 502 and 504, which correspond to the original peaks 402 and 404 of the input optical signal, respectively. Also, there are additional spectral peaks that are produced by the LO sideband peaks on both sides of the peaks 502 and 504. If $f_m \approx f_s/2$, then there are two nearly overlapping or overlapping peaks 506 in-between the peaks 502 and 504. These peaks 506 are formed by the LO sideband peaks 304 and the original peaks 402 and 404 of the input signal. The two nearly overlapping or overlapping peaks 506 will produce a single observable spectral peak, which will be referred to herein as an "inner peak". Thus, the inner peak is a combination of the original peak 402 and 404 of the input signal. The inner peak is created by the dual heterodyne signal that produces a beat (amplitude modulated heterodyne signal). The phase of that beat is related to the phase difference $\phi_2 - \phi_1$. Therefore, the inner peak contains the phase difference, $\phi_2 - \phi_1$, of the original peaks 402 and 404 of the input signal.

The analysis with respect to the peaks 506 of the reconstructed spectrum 500 can be shown mathematically by expanding the mixing terms of the equation (5) into a series. The following series expansions can be used to expand the mixing terms.

$$\cos(\alpha\cos\xi) = J_0(\alpha) + 2\sum_{j=1}^{\infty}(-1)^j J_{2j}(\alpha) \cdot \cos(2j\xi) \quad (6)$$

$$\cos(\alpha\cos\xi) = 2\sum_{j=0}^{\infty}(-1)^j J_{2j+1}(\alpha) \cdot \cos((2j+1)\xi). \quad (7)$$

The peaks 506 of the reconstructed spectrum 500 are identified by their frequency and their dependence on $J_1(\alpha)$:

$$p = 2a_0 a_1 J_1(\alpha)\sin(2\pi(\nu_1 - \nu_0 + f_m)t + \phi_1 + \psi + \phi_n - \phi_0) + 2a_0 a_2 J_1(\alpha)\sin(2\pi(\nu_2 - \nu_1 - f_m)t + \phi_2 - \psi + \phi_n - \phi_0), \quad (8)$$

where p denotes the amplitude of the inner peak. By choosing $\nu_0 = (\nu_1 + \nu_2)/2$ (LO frequency in-between the measured peaks 402 and 404 of the input signal) and $f_m = (\nu_2 - \nu_1)/2$ (the modulation frequency equal to a half of the frequency difference between the measured peaks of the input signal, i.e., $f_m = f_s/2$), both peaks 506 are mixed to DC. This choice is not necessary, but it simplifies the mathematical form of the equation (8) to:

$$b = a_1 \sin(\phi_1 + \psi + \phi_n - \phi_0) + i\, a_2 \sin(\phi_2 - \psi + \phi_n - \phi_0), \quad (9)$$

where $b = p/(2a_0 J_1(\alpha))$ is a normalized amplitude of the inner peak. The equation (9) describes a simple trigonometric problem of a triangle, as shown in FIG. 6.

Figure 6:
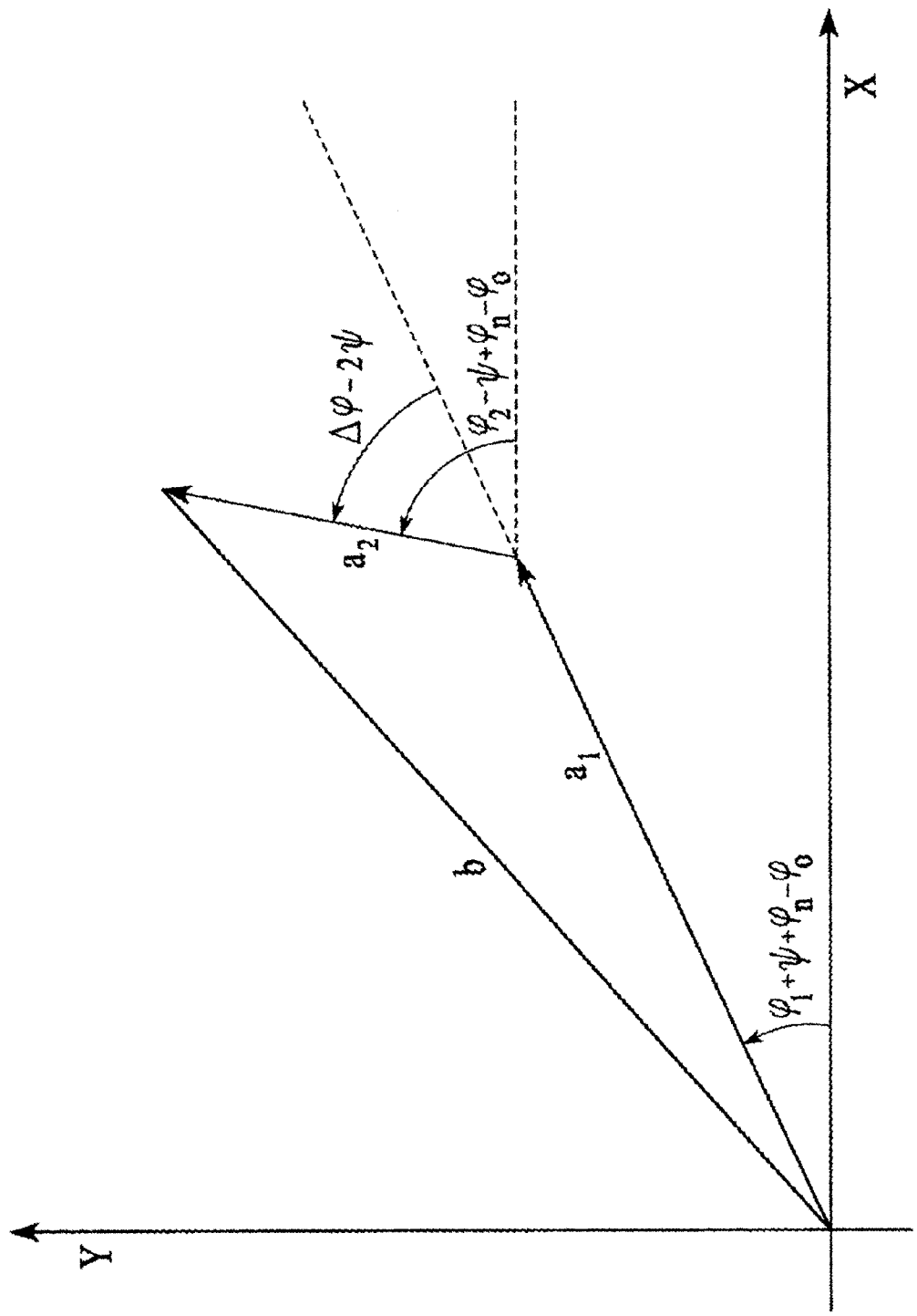
FIG. 6 illustrates the concept of a triangle to solve for a phase difference between peaks of the input optical signal using the inner peaks of a heterodyne signal.

The amplitude of the inner peak can be computed by the addition of phasors having amplitudes $a_1$ and $a_2$, as shown in FIG. 6. From the equation of a triangle, the following equation can be derived.

$$b^2 = a_1^2 + a_2^2 + 2a_1 a_2 \cos(\Delta\phi - 2\psi). \quad (10)$$

It is important to note that the phase noise terms $\phi_n$ and $\phi_0$ are not in the equation (10). The term to be solved for in the equation (10) is $\Delta\phi$, which is the phase difference between the two peaks 402 and 404 of the input optical signal having a spectrum 400, i.e., $\Delta\phi = \phi_2 - \phi_1$.

According to a delay property of the Fourier transform:

$$F(\omega) \xrightarrow{F^{-1}} f(t)$$

$$e^{-j\omega t_0} F(\omega) \xrightarrow{F^{-1}} f(t - t_0)$$

Since the input optical signal is periodic in the time domain, the delay $t_0$ and the corresponding time shift $e^{j\omega t_0}$ is of no consequence. This simplifies methods for solving the equation (10). Instead of solving for $\Delta\phi$, the equation (10) can be solved for $\Delta\phi+\psi_r$, where $\psi_r$ is a constant that is the same for all the measured inner peaks. Consequently, the angle $\Delta\phi+\psi_r$ becomes the new $\Delta\phi$ to be found.

In a first embodiment of the invention, the equation (10) is solved using discrete phase shifts $\pm\Delta\psi$ of the LO modulation signal. In this embodiment, the LO signal is phase modulated such that $f_m=f_s/2$. First, the size of the inner peak is measured for an arbitrary reference phase $\psi=\psi_r$, and, then, for two other phases $\phi_{+,-}=\psi_r\pm\Delta\psi$. Thus, three measurements are made to compute the phase difference $\Delta\phi$. The phase shifts $\pm\Delta\psi$ are introduced by the modulation controller 120, as described further below. Since the actual value of $\psi_r$ does not matter (a delay property of the Fourier transform), it is assumed that $\psi_r=0$. From the equation (10), the following equations are obtained.

$$b_-^2 = a_1^2 + a_2^2 + 2a_1a_2\cos(\Delta\phi+2\Delta\psi) \quad (11a)$$

$$b_r^2 = a_1^2 + a_2^2 + 2a_1a_2\cos(\Delta\phi) \quad (11b)$$

$$b_+^2 = a_1^2 + a_2^2 + 2a_1a_2\cos(\Delta\phi-2\Delta\psi) \quad (11c)$$

By subtracting the equation (11b) from the equations (11a) and (11c), and performing some trigonometric simplifications, the solution for $\tan\Delta\phi$ is:

$$\tan\Delta\varphi = \frac{b_+^2 - b_-^2}{2b_r^2 - b_+^2 - b_-^2} \cdot \tan\Delta\psi \quad (12)$$

The term $\tan\Delta\psi$ from the equation (12) is made equal to one by choosing $\Delta\psi=\pi/4$.

Figure 7:
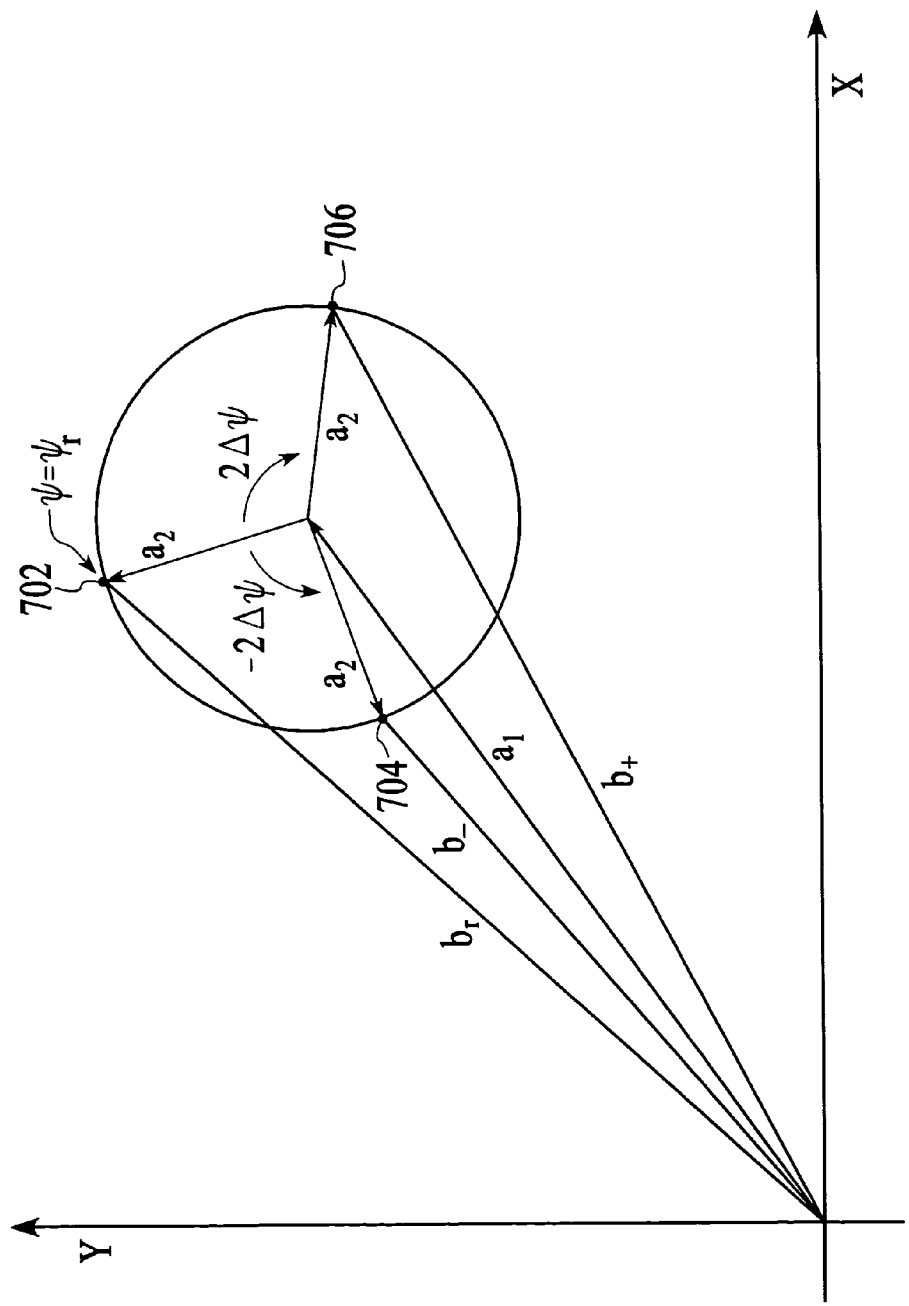
FIG. 7 illustrates a technique to measure the phase difference using the concept of FIG. 6 in accordance with a first embodiment of the invention.

Graphically, the phase shift technique to solve for $\Delta\phi$ in the equation (10) can be illustrated as selecting points from a circle traced by the phasor $\vec{a}_2$, e.g., points 702, 704 and 706, as shown in FIG. 7. Using the measurements of $b_+$, $b_-$ and $b_r$, the phase difference $\Delta\phi$ can be solved for using the equation (12).

Figure 8A:
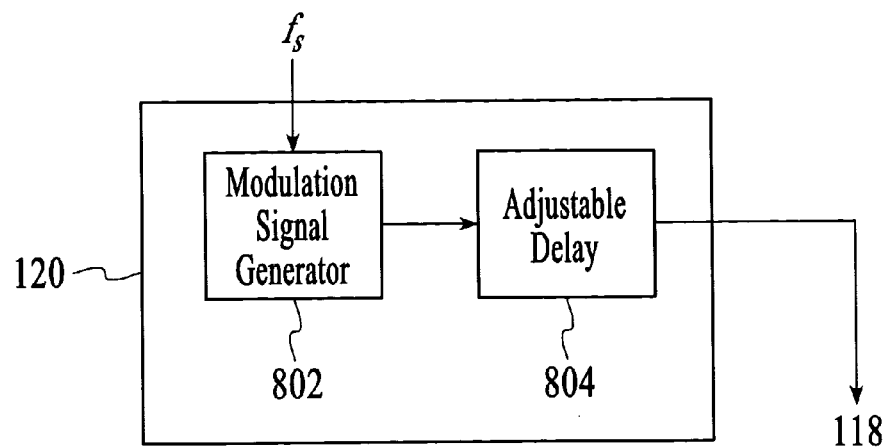
FIG. 8A shows components of a modulation controller included in the HOSA system of FIG. 1 in accordance with the first embodiment of the invention.
Figure 8B:
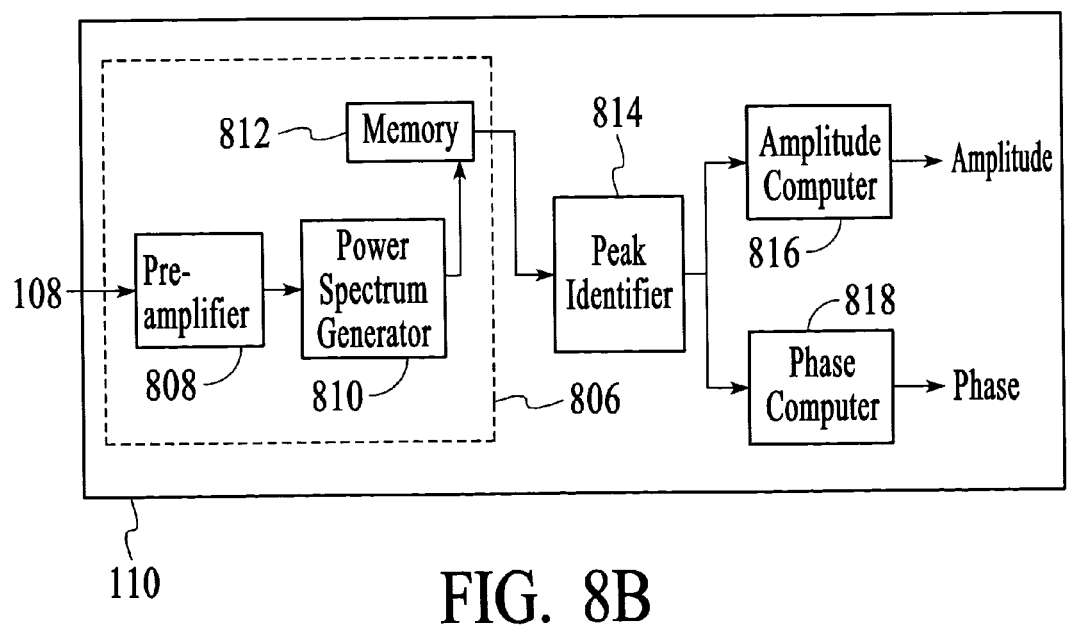
FIG. 8B shows components of a processing unit included in the HOSA system of FIG. 1 in accordance with the first embodiment of the invention.

Turning now to FIGS. 8A and 8B, the components of the modulation controller 120 and the processing unit 110 of the HOSA system in accordance with the first embodiment of the invention are shown. As described above and shown in FIG. 1, the modulation controller 120 is connected to the phase modulator 118 to provide a modulation signal so that the sideband peaks are added to the LO spectrum from the LO source 116. As shown in FIG. 8A, the modulation controller 120 includes a modulation signal generator 802 and an adjustable delay 804. The modulation signal generator 802 provides the modulation signal whose frequency is equal to $f_s$. The signal at the frequency $f_s$ may be supplied to the modulation signal generator 802 from an external source. The adjustable delay 804 provides the needed phase shifts $\pm\Delta\psi$. The modulation signal is then transmitted to the phase modulator 118 to modulate the LO signal from the LO source 116. The modulated LO signal is combined with the input optical signal at the optical coupler 106.

As shown in FIG. 8B, the processing unit 108 includes a pre-processing section 806, which comprises a preamplifier 808, a power spectrum generator 810 and memory 812. The preamplifier 808 is connected to the optical receiver 108 to receive an electrical signal of photo-converted current generated by the optical receiver, which represent the heterodyne signal produced by the mixing of the input optical signal and the phase modulated LO signal. The preamplifier 808 operates to amplify the electrical signal from the optical receiver 108. The amplified electrical signal is then squared by the power spectrum generator 810 to produce a power spectrum, which is a reconstructed optical spectrum of the input optical signal having spectral peaks that correspond to the original spectral peaks of the input optical signal, as well as inner additional spectral peaks. The power spectrum is stored in the memory 812 for subsequent processing to compute the spectral amplitude and the spectral phase of the input optical signal. Depending on the number of measurements to be made using different phase shifts (three in this embodiment), a corresponding number of power spectra are generated and stored.

The processing unit 110 further includes a peak identifier 814, an amplitude computer 816 and a phase computer 818. For each power spectrum, the peak identifier 814 determines the peaks of the power spectrum, including the original spectral peaks and the inner spectral peaks. The peaks that correspond to the original spectral peaks of the input optical signal are used to compute the spectral amplitude of the input signal by the amplitude computer 816. Since multiple measurements are not needed to compute the spectral amplitude, only the respective peaks from one of the stored power spectrum may be used. Alternatively, multiple power spectra may be used to find an average measurement of the amplitude. The corresponding inner peaks of the three power spectra are used to compute the phase difference, $\Delta\phi$, by the phase computer 818 using the equation (12). The spectral phase is computed from the phase difference by summing consecutive phase differences, i.e., $\phi_i=\Sigma\Delta\phi_i$. The computed spectral amplitude and phase of the input optical signal can then be further processed using the Fourier transform to compute the amplitude and phase in the time domain. The chirp of the input optical signal can be found from the derivative of phase in the time domain.

Figure 9A:
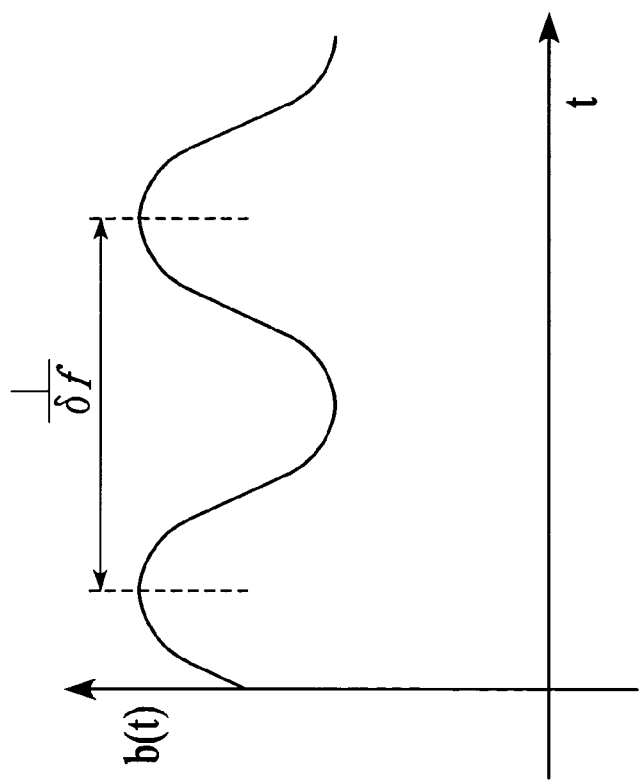
FIGS. 9A and 9B illustrate a technique to measure the phase difference using the concept of FIG. 6 in accordance with a second embodiment of the invention.
Figure 9B:
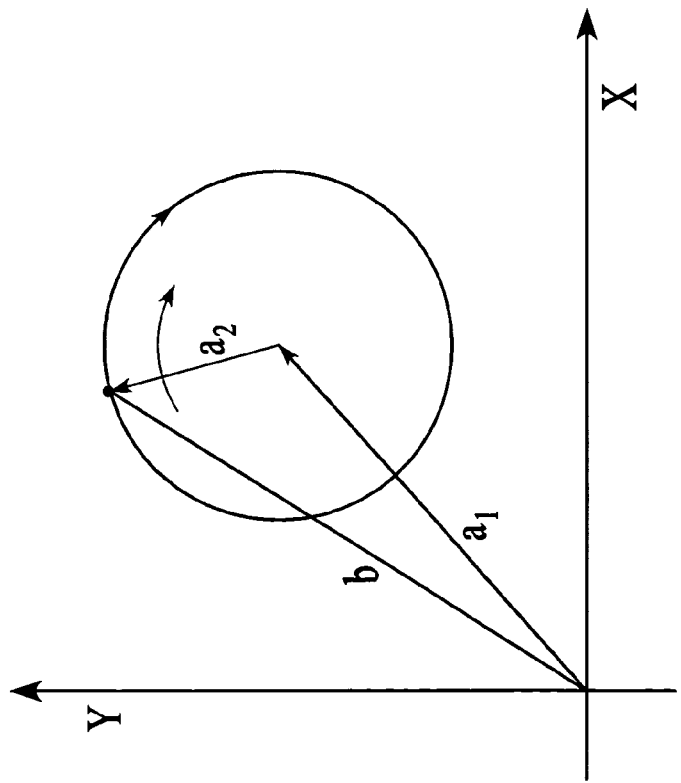

In a second embodiment of the invention, the phase difference $\Delta\phi$ is measured by comparing the phase of the oscillatory behavior of the inner peaks to the phase of the reference signal at the electrical frequency $f_r=\delta f$. A graphical explanation of this phase difference measurement is now described. Assume that the peaks 506 in FIG. 5C are not at the same frequency but that there is a frequency difference between the peaks equal to $\delta f$. This means that the phase modulation frequency is not equal to $f_s/2$ but to $f_s/2+\delta f/2$ or to $f_s/2\delta f/2$. Then, using the concept of FIG. 6, the phasor $\vec{a}_2$ will rotate around the phasor $\vec{a}_1$, as shown in FIG. 9A. Therefore, the amplitude of the resulting inner peak, which is proportional to b, will oscillate at the frequency $\delta f$, as shown in FIG. 9B. The oscillatory behavior of b(t) can then be defined by the following equation:

$$b(t)^2 = A + B\cos(2\pi\delta ft + \Delta\psi), \quad (13)$$

where A and B are some constants. The phase of the oscillating $b(t)^2$ from the equation (13), as compared to the phase of the reference signal $r(t)=C \cos(2\pi\delta ft)$, is a measure of the phase difference $\Delta\phi$.

Figure 10A:
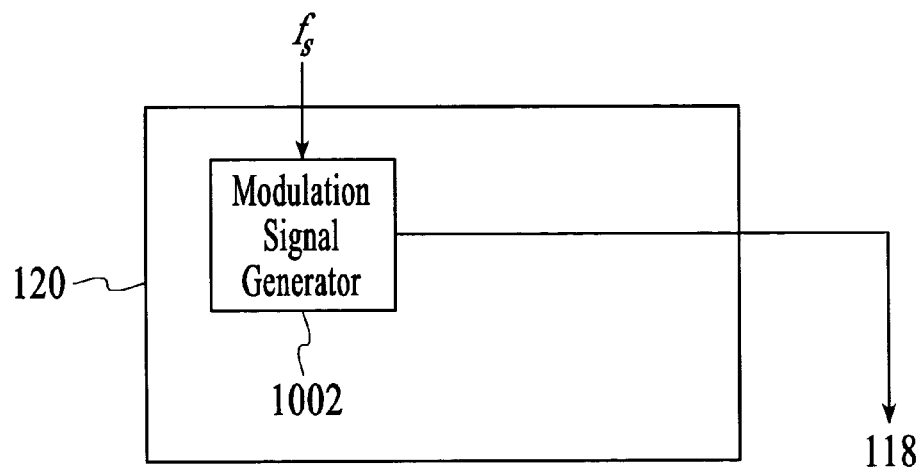
FIG. 10A shows components of the modulation controller in accordance with the second embodiment of the invention.
Figure 10B:
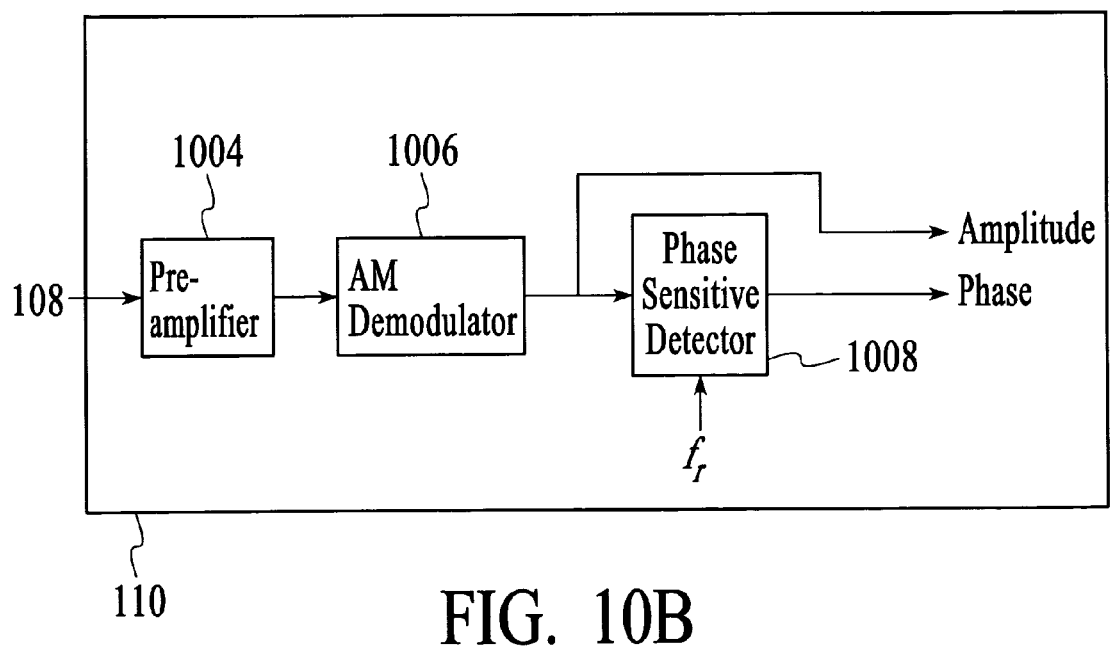
FIG. 10B shows components of the processing unit in accordance with the second embodiment of the invention.

Turning now to FIGS. 10A and 10B, the components of the modulation controller 120 and the processing unit 110 of the HOSA system 100 in accordance with the second embodiment of the invention is shown. In this embodiment, the modulation controller 120 includes only a modulation signal generator 1002 and does not include an adjustable delay, as shown in FIG. 10A. The modulation signal generator 1002 provides the modulation signal that is offset from the frequency $f_s/2$ by $\delta f/2$, i.e., $f_m=f_s/2+\delta f/2$ or $f_m=f_s/2-\delta f/2$. The electrical signal at the frequency $f_s$ may be supplied to the modulation signal generator 1002 from an external source. The modulation signal is transmitted to the phase modulator 118 to modulate the LO signal from the LO source 116. The modulated LO is combined with the input optical signal at the optical coupler 106.

As shown in FIG. 10B, the processing unit 110 includes a preamplifier 1004, an AM demodulator 1006 and a phase sensitive detector 1008. The preamplifier 1004 amplifies the electrical signal generated by the optical receiver 108, i.e., the heterodyne signal that can be used to produce a reconstructed optical spectrum of the input optical signal. The amplified electrical signal is then demodulated by the AM demodulator 1006. The AM demodulator 1006 recovers the amplitude of the spectral peaks of the input optical signal. Then, the demodulated signal is transmitted to the phase sensitive detector 1008, where the demodulated signal containing the beat between the two heterodyne signals of the inner spectral peaks (their amplitude modulation) is compared with a reference signal having a frequency of $f_r=\delta f$ to recover the spectral phase difference of the input optical signal for all pairs of the adjacent sideband peaks. The reference frequency $f_r$ can be produced from $f_m$ and $f_s$ by mixing the two frequencies. The measured spectral amplitude and the spectral phase can then be further processed to compute the amplitude and phase of the input optical signal in the time domain by means of the Fourier transform. The chirp of the input optical signal can be found from the derivative of the computed phase in the time domain.

Figure 11:
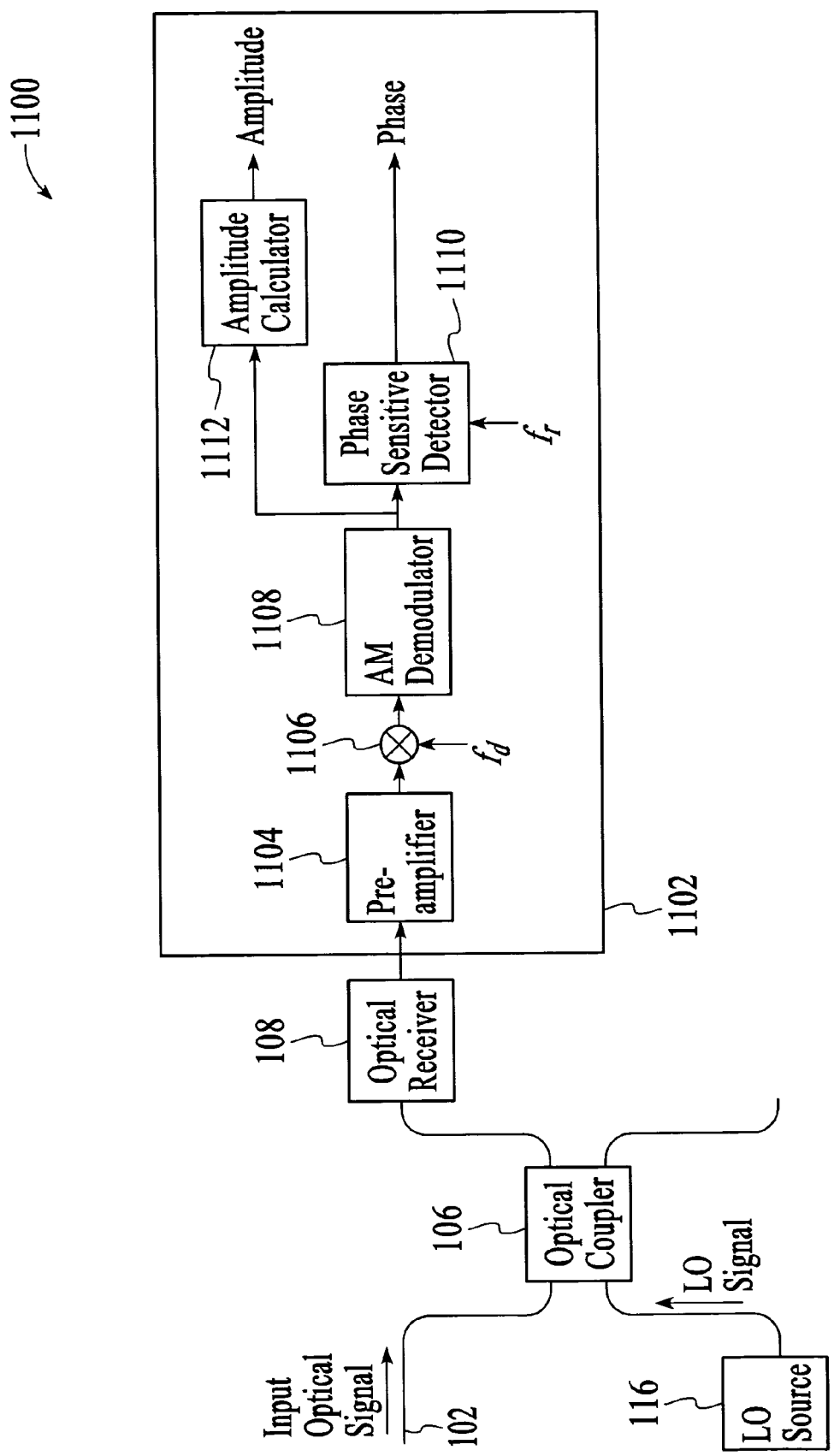
FIG. 11 is a diagram of a HOSA system in accordance with an alternative second embodiment of the invention.

In FIG. 11, a HOSA system 1100 in accordance with an alternative second embodiment is shown. The HOSA system 110 uses the rotating phasor concept of FIGS. 9A and 9B to derive spectral amplitude and phase of an input optical signal. However, the HOSA system 1100 is configured to use an electrical mixing technique, rather than an optical mixing technique, so that an unmodulated LO signal can be used. Thus, the phase modulator 118 and the modulation controller 120 are not included in the HOSA system 1100. In this alternative embodiment, the bandwidth of the optical receiver 108 must be wider than $f_s$.

Figure 12A:
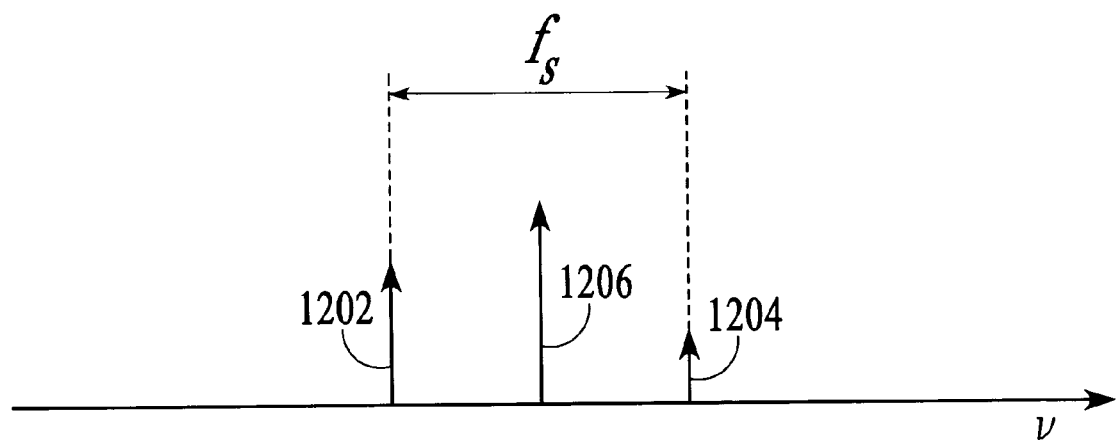
FIGS. 12A and 12B illustrate combining of input spectral peaks when using an electrical mixing technique in accordance with the alternative second embodiment of the invention.
Figure 12B:
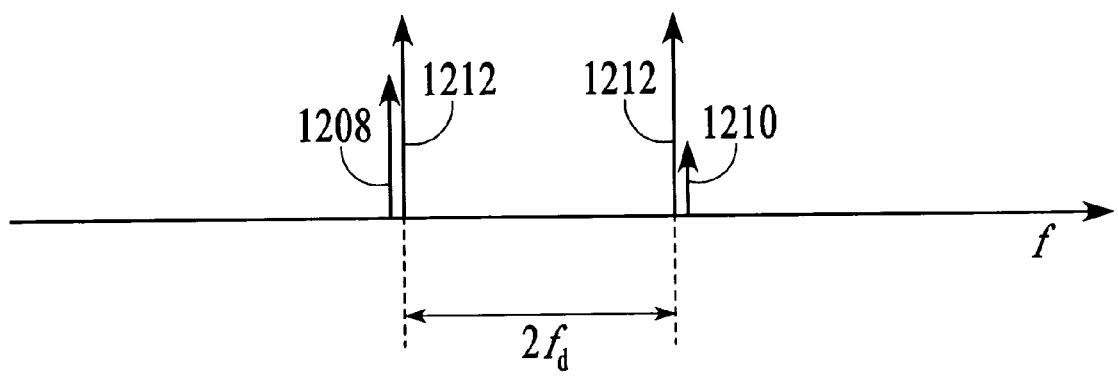

As shown in FIG. 11, the HOSA system 1100 includes a processing unit 1102, which comprises a preamplifier 1104, a mixer 1106, an AM demodulator 1108, a phase sensitive detector 1110 and an amplitude calculator 1112. The preamplifier 1104 amplifies the electrical signal generated by the optical receiver 108, i.e., the heterodyne signal. The amplified electrical signal is mixed at the mixer 1106 with an electrical signal having a frequency $f_d$, which is equal to $f_s/2-\delta f$ or $f_s/2+\delta f$. As illustrated in FIGS. 12A and 12B, this results in a simultaneous observation of the adjacent spectral peaks 1202 and 1204 of the input signal when the LO signal 1206 is approximately in-between the peaks of the optical input signal. FIG. 12A shows the optical LO signal 1206 being in-between the adjacent optical spectral peaks 1202 and 1204 of the optical input signal. The optical LO signal 1206 combines with each of the adjacent optical spectral peaks 1202 and 1204 to produce the electrical spectral peaks 1208 and 1210 in the RF (shown in FIG. 12B) that correspond to the original adjacent spectral peaks. FIG. 12B shows the RF spectral peaks 1208 and 1210 and the electrical signal 1212 having frequencies $\pm f_d$ that are electrically mixed to produce dual heterodyne signal being amplitude modulated at the frequency $\delta f$. The dual heterodyne signal forms the desired "inner" spectral peak that combines the adjacent spectral peaks of the original spectrum of the input optical signal.

The phase of the AM of the dual heterodyne signal contains the information about the phase difference. In addition, the dual heterodyne signal is used to reconstruct spectral peaks that are related to the original spectral peaks of the input optical signal. Namely, each reconstructed peak is a combination of two adjacent peaks of the original spectrum. Thus, each reconstructed spectral peak is an inner peak that contains phase difference information of the adjacent original spectral peaks and power of the adjacent original peaks, i.e., on average $b_i^2=a_i^2+a_{i+1}^2$, as in the equation (10). In other words, the oscillatory behavior of $b_i$ described by the equation (10) provides phase difference information, while its average amplitude can be used to find the original amplitudes $a_i$ (original spectral amplitude). The mixed electrical signal is then demodulated by the AM demodulator 1108. The AM demodulator 1108 recovers the amplitude of the inner spectral peaks that is used to find the amplitude of the original spectral peaks of the input optical signal from the equation $b_i^2=a_i^2+a_{i+1}^2$ by the amplitude calculator 1112, which in effect reconstructs the original spectral peaks of the optical input signal from the inner spectral peaks. The demodulated signal is also transmitted to the phase sensitive detector 1110, where the demodulated signal is compared with a reference signal having a frequency $f_r=f_s-2f_d=\delta f$ to recover the spectral phase of the input signal. The reference signal at the frequency $f_r$ can be constructed from $f_s$ and $2f_d$ by mixing the two frequencies. The measured spectral amplitude and the spectral phase can then be further processed to compute the amplitude and phase of the input optical signal in the time domain by means of the Fourier transform. The chirp of the input optical signal can be found from the derivative of the computed phase in the time domain.

Figure 13A:
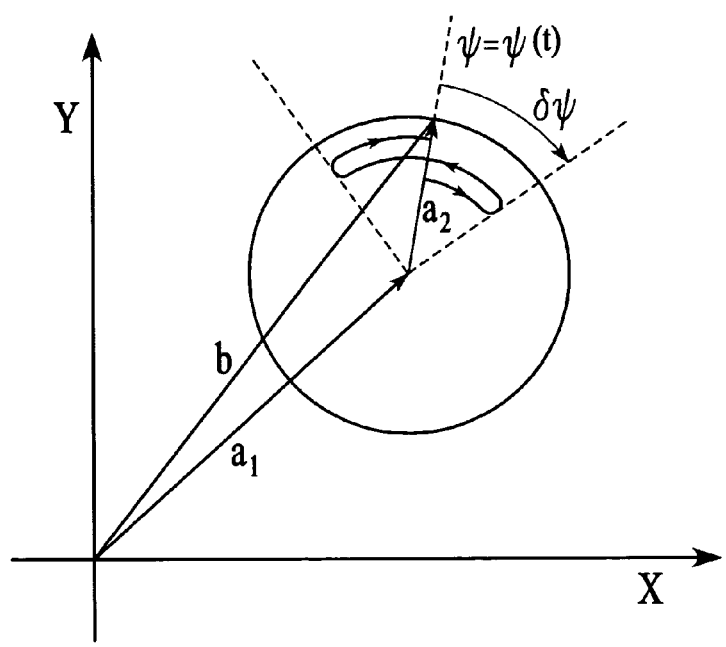
FIGS. 13A and 13B illustrate a technique to measure the phase difference using the concept of FIG. 6 in accordance with a third embodiment of the invention.
Figure 13B:
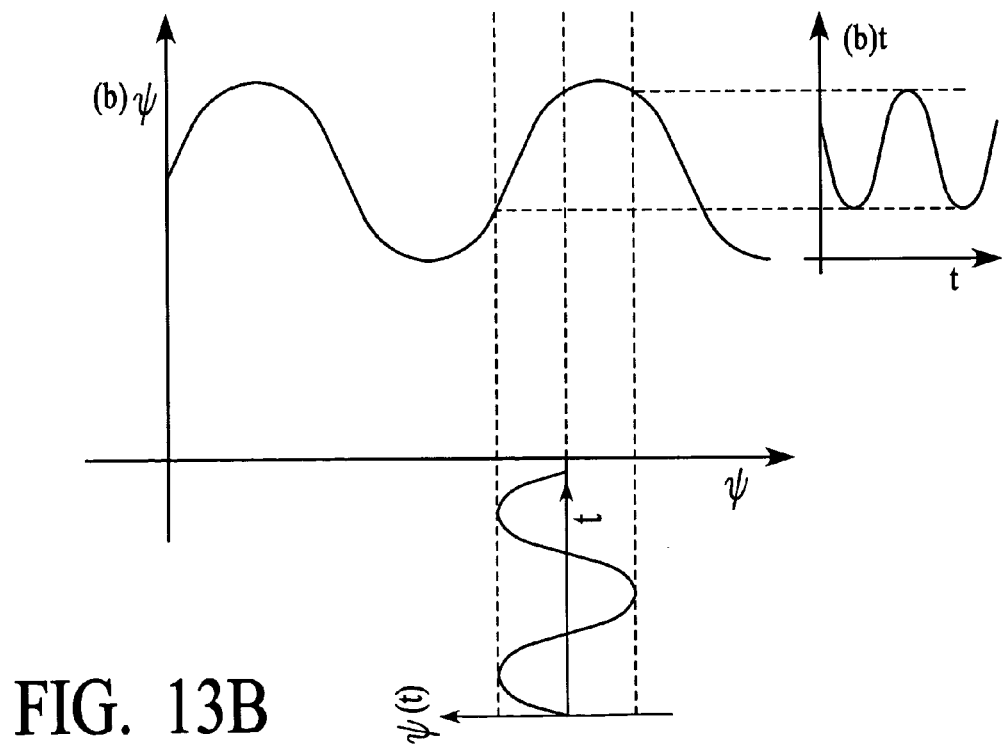

In a third embodiment of the invention, the phase difference $\Delta\phi$ is measured by monitoring an oscillatory behavior of the inner peaks caused by phase modulation of the electrical modulation signal applied to the optical modulator 118. An explanation of the phase shift measurement in accordance with the third embodiment is now described. Assume that the modulation controller 120 from FIG. 1 provides a signal at the electrical frequency $f_s$ that is phase modulate by a phase term $\psi(t)=\delta\psi \cos(\omega_\psi t+\Theta)$, where $\omega_\psi=2\pi f_\psi$. Then, using the concept of FIG. 6, the phasor $\vec{a}_2$ will move back and forth such that the angle between the phasors $\vec{a}_1$ and $\vec{a}_2$ will continuously vary in a sinusoidal manner, as shown in FIG. 13A. Consequently, the amplitude of the phasor $\vec{b}$ will change periodically, as shown in FIG. 13B, according to the following function.

$$b(t)^2 = A + B \cos(\Delta\phi + \delta\psi \cos(\omega_\psi t+\Theta)), \quad (14)$$

where A and B are constants. Thus, b(t) contains harmonics of the electrical phase modulation frequency $f_\psi$. An appropriate series expansion of the function (14) gives:

$$b(t)^2 = BJ_0(\delta\psi)\cos(\Delta\varphi) - \qquad (15)$$
$$2BJ_2(\delta\psi)\cos(2(\omega_\psi + \Theta))\cos(\Delta\varphi) +$$
$$2BJ_4(\delta\psi)\cos(4(\omega_\psi + \Theta))\cos(\Delta\varphi) -$$
$$\vdots$$
$$2BJ_1(\delta\psi)\cos(\omega_\psi + \Theta)\sin(\Delta\varphi) +$$
$$2BJ_3(\delta\psi)\cos(3(\omega_\psi + \Theta))\sin(\Delta\varphi) -$$
$$2BJ_2(\delta\psi)\cos(5(\omega_\psi + \Theta))\sin(\Delta\varphi)$$
$$\vdots$$

The relative amplitudes of the odd and even harmonics are proportional to $\sin(\Delta\phi)$ and $\cos(\Delta\phi)$, respectively. Thus, measurements of one odd harmonic and one even harmonic allow the phase difference $\Delta\phi$ to be found. For example, the phase difference $\Delta\phi$ may be computed by using the amplitude of the first harmonic, $h_1 = 2BJ_1(\delta\psi)\sin(\Delta\phi)$, and the amplitude of the second harmonic, $h_2 = 2BJ_2(\delta\psi)\cos(\Delta\phi)$, in accordance with the following equation:

$$\tan\Delta\varphi = \frac{h_1 J_2(\delta\psi)}{h_2 J_1(\delta\psi)} \qquad (16)$$

Figure 14A:
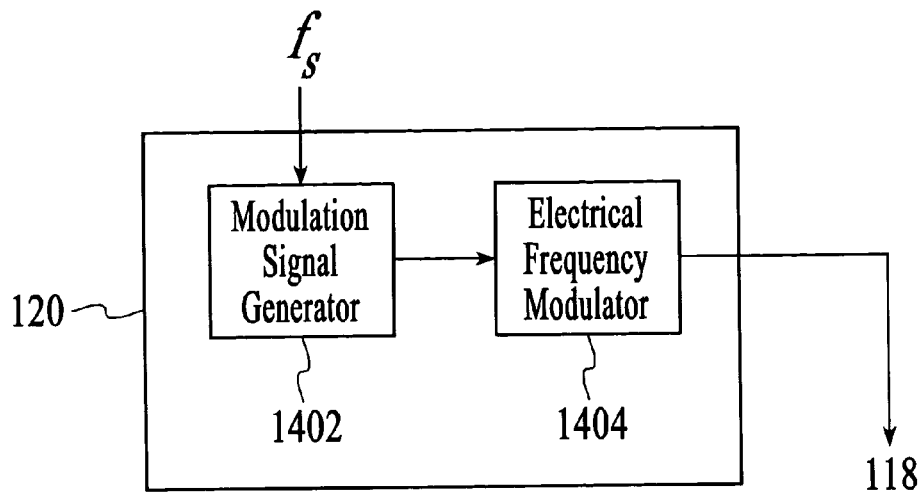
FIG. 14A shows components of the modulation controller in accordance with the third embodiment of the invention.
Figure 14B:
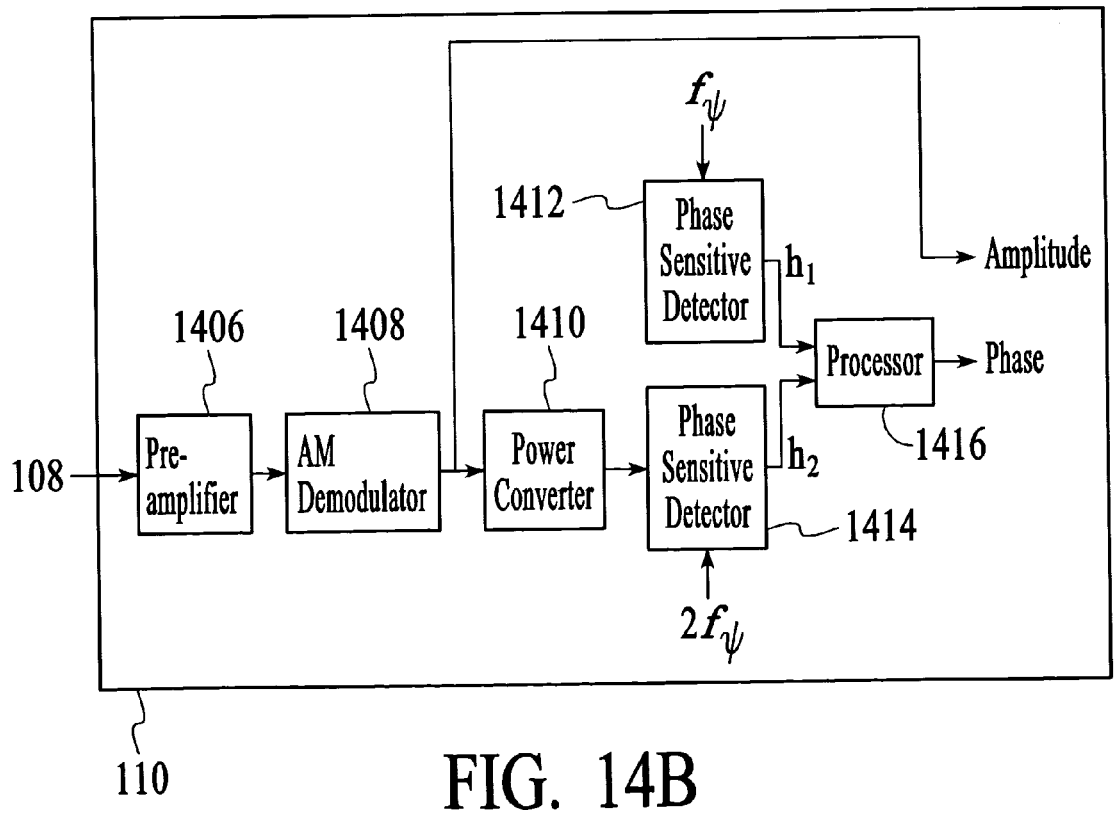
FIG. 14B shows components of the processing unit in accordance with the third embodiment of the invention.

Turning now to FIGS. 14A and 14B, the components of the modulation controller 120 and the processing unit 110 of the HOSA system 100 in accordance with the third embodiment of the invention is shown. In this embodiment, the modulation controller 120 includes a modulation signal generator 1402 and an electrical frequency modulator 1404, as shown in FIG. 14A. The modulation signal generator 1402 provides a modulation signal at the electrical frequency $f_s$. The electrical frequency $f_s$ may be supplied from an external source. The modulation signal at the electrical frequency $f_s$ is then phase modulated by the electrical frequency modulator 1404 at the electrical frequency $f_\psi$, and supplied to the optical modulator 118.

As shown in FIG. 14B, the processing unit 110 includes a preamplifier 1406, an AM demodulator 1408, a power converter 1410, phase sensitive detectors 1412 and 1414 and a processor 1416. The preamplifier 1406 amplifies the electrical signal generated by the optical receiver 108, i.e., the heterodyne signal that can be used to produce a reconstructed optical spectrum of the input optical signal. The amplified electrical signal is then demodulated by the AM demodulator 1408. The AM demodulator 1408 recovers the amplitude of the spectral peaks of the input optical signal. The demodulated signal is then squared by the power converter 1410 and transmitted to the phase sensitive detectors 1412 and 1414. The amplitudes of odd harmonics and even harmonics of the electrical phase modulation frequency $f_\psi$ are measured at the phase sensitive detectors 1412 and 1414. As an example, the phase sensitive detector 1412 may be configured to measure the amplitude of the first harmonics, $h_1$, using a reference signal having an electrical frequency of $f_\psi$, while the phase sensitive detector 1414 is configured to measure the amplitude of the second harmonic, $h_2$, using another reference signal having an electrical frequency of $2f_\psi$. These measured amplitudes are transmitted to the processor 1416 where the phase difference $\Delta\phi$ is computed using the equation (16) to determine the spectral phase of the optical input signal. The recovered spectral amplitude and the spectral phase difference can then be further processed to compute the amplitude and phase of the input optical signal in the time domain by means of the Fourier transform. The chirp of the input optical signal can be found from the derivative of the computed phase in the time domain.

Figure 15:
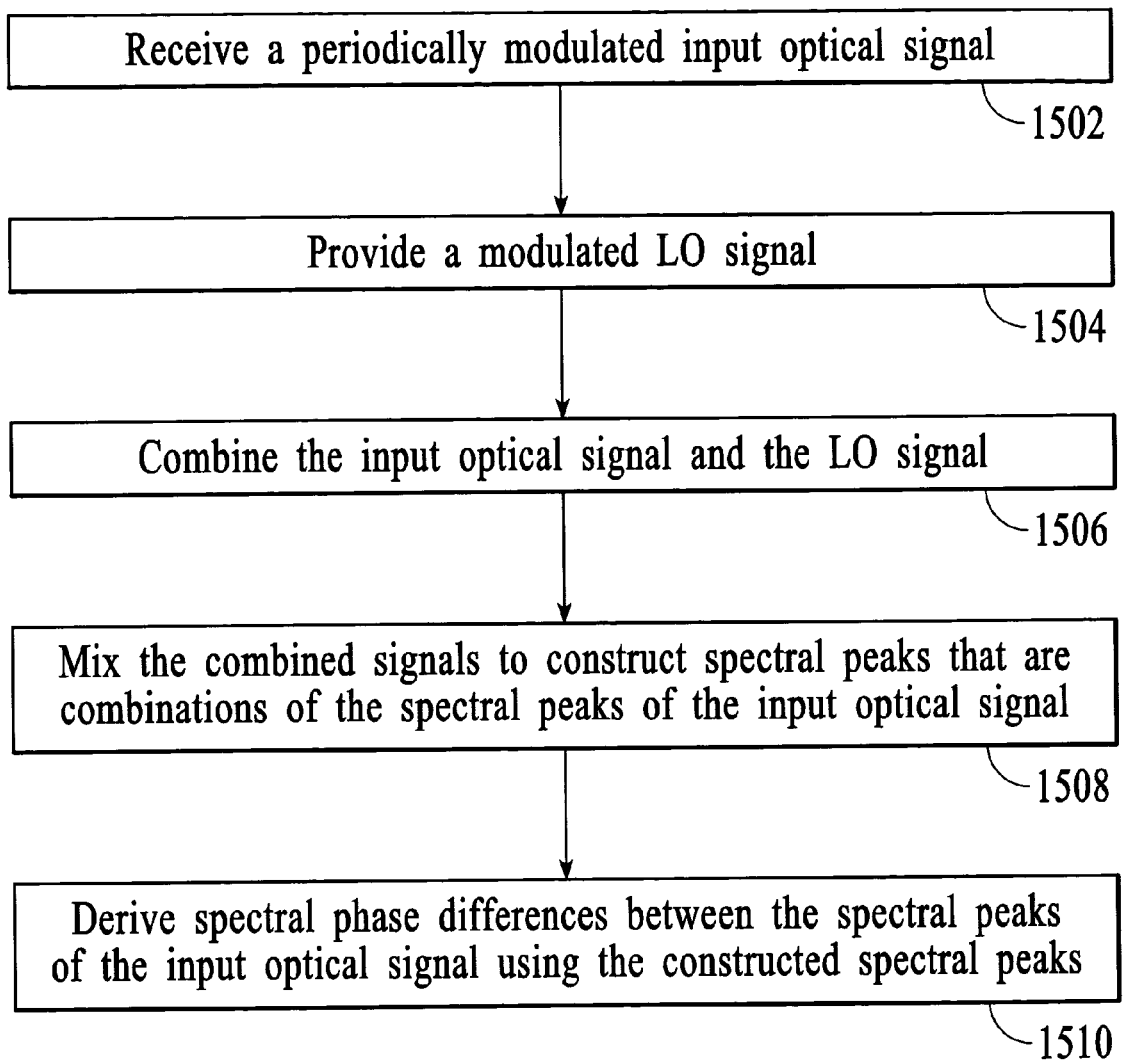
FIG. 15 is a process flow diagram of a method for measuring optical properties of optical signals in accordance with an embodiment of the invention.

A method for analyzing optical properties of optical signals, such as amplitude and phase in the time domain, in accordance with an embodiment of the invention is described with reference to a flow diagram of FIG. 15. At block 1502, an input optical signal is received. The input optical signal is a periodically modulated signal. Thus, the input optical signal includes peaks at frequencies separated by fixed frequency intervals. At block 1504, a modulated LO signal having a central peak and sideband peaks is provided. Next, at block 1506, the input optical signal and the modulated LO signal are combined. At block 1508, the combined signals are mixed to construct spectral peaks that are combinations of the spectral peaks of the input optical signal. Next, at block 1510, the spectral phase differences between the spectral peaks of the input optical signal are derived using the constructed spectral peaks.

Figure 16:
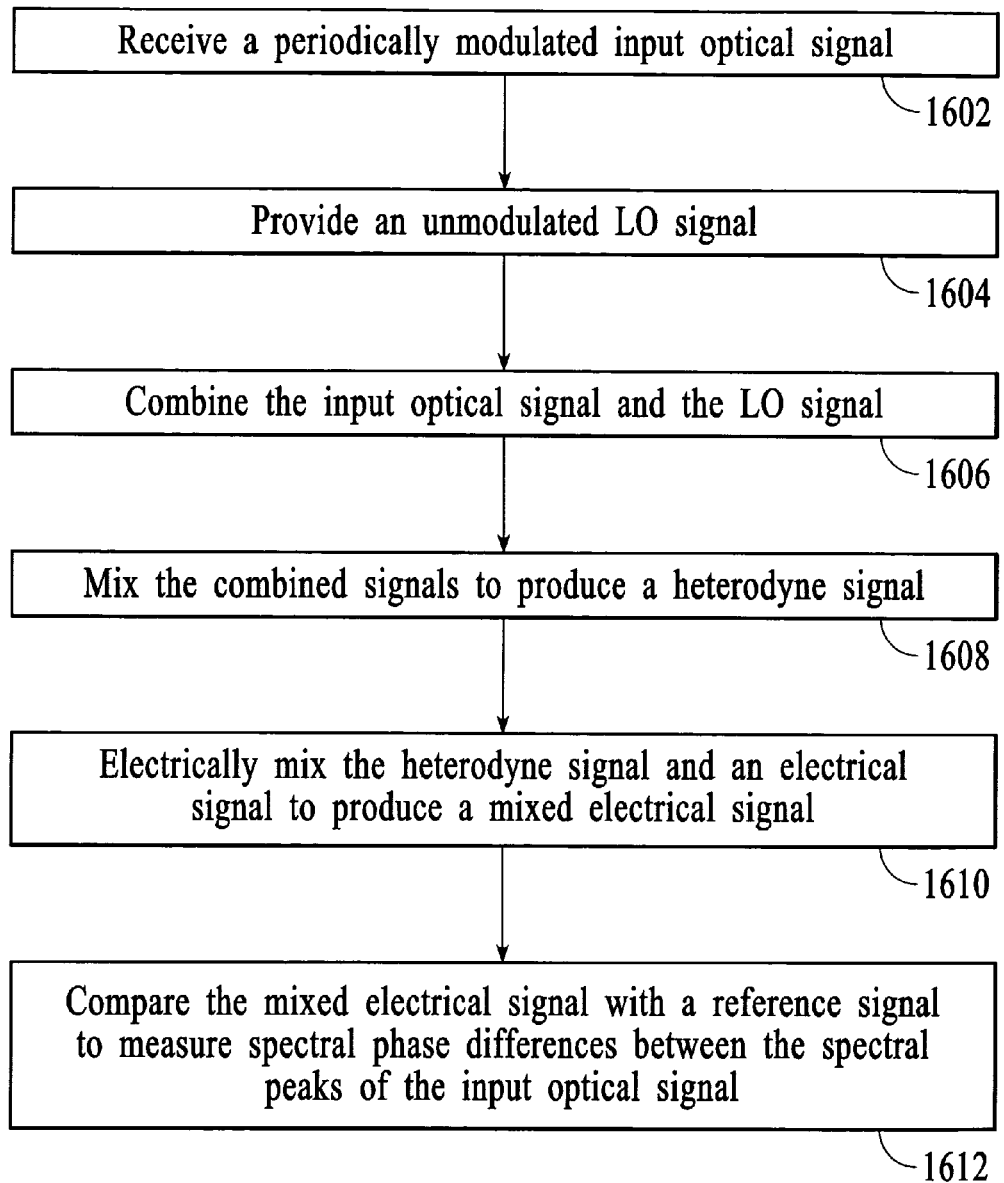
FIG. 16 is a process flow diagram of a method for measuring optical properties of optical signals in accordance with another embodiment of the invention.

A method for analyzing optical properties of optical signals, such as amplitude and phase in the time domain, in accordance with another embodiment of the invention is described with reference to a flow diagram of FIG. 16. At block 1602, an input optical signal is received. The input optical signal is a periodically modulated signal. Thus, the input optical signal includes peaks at frequencies separated by fixed frequency separations. At block 1604, an unmodulated LO signal is provided. Next, at block 1606, the input optical signal and the LO signal are combined. At block 1608, the combined signals are mixed to produce a heterodyne signal. Next, at block 1610, the heterodyne signal is electrically mixed with an electrical signal to produce a mixed electrical signal having spectral peaks that are combinations of the spectral peaks of the input optical signal. At block 1612, the mixed electrical signal is compared with a reference signal to measure the spectral phase differences between the spectral peaks of the input optical signal.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for analyzing optical properties of optical signals comprising:
   receiving an input optical signal having input spectral peaks at different frequencies;
   providing a local optical signal having a central spectral peak and a side spectral peak; and
   combining and mixing said input optical signal and said local optical signal to construct output spectral peaks that include combinations of said input spectral peaks of said input optical signal.

2. The method of claim 1 further comprising deriving spectral phase differences between said input spectral peaks of said input optical signal using said output spectral peaks.

3. The method of claim 2 wherein said providing of said local optical signal includes optically modulating a local oscillator signal with respect to one of intensity and phase to produce said local optical signal.

4. The method of claim 3 wherein said optically modulating of said local oscillator signal includes optically modulating said local oscillator signal such that the frequency separation between said central spectral peak and said side spectral peak is approximately equal to an integer times half of the frequency separation of said input spectral peaks of said input optical signal.

5. The method of claim 4 wherein said optically modulating of said local oscillator signal includes shifting the phase of an electrical modulation signal used to phase modulate said local oscillator signal such that amplitudes of said output spectral peaks are changed.

6. The method of claim 5 wherein said deriving of said spectral phase differences includes computing said spectral phase differences between said input spectral peaks of said input optical signal using said output spectral peaks produced by said shifting of said phase of said electrical modulation signal.

7. The method of claim 4 wherein said optically modulating of said local oscillator signal includes modulating the phase of an electrical signal used to phase modulate said local oscillator signal.

8. The method of claim 7 wherein said deriving of said spectral phase differences includes measuring amplitudes of different harmonics of the frequency of said electrical signal.

9. The method of claim 8 wherein said deriving of said spectral phase differences computing said spectral phase differences between said input spectral peaks of said input optical signal using said amplitudes of even and odd harmonics of said frequency of said electrical signal.

10. The method of claim 3 wherein said optically modulating of said local oscillator signal includes optically modulating said local oscillator signal such that the frequency separation between said central spectral peak and said side spectral peak is equal to an integer times half of the frequency separation of said input spectral peaks of said input optical signal offset by a reference frequency.

11. The method of claim 10 wherein said deriving of said phase differences includes comparing said output spectral peaks with a reference signal having said reference frequency to measure said spectral phase differences of said input spectral peaks of said input optical signal.

12. An optical analyzer system comprising:
an input to receive an input optical signal having input spectral peaks at different frequencies;
an optical signal generator configured to generate a local optical signal having a central spectral peak and a side spectral peak;
an optical coupler configured to combine said input optical signal and said local optical signal; and
an optical receiver configured to receive and mix said input optical signal and said local optical signal to construct output spectral peaks that include combinations of said input spectral peaks of said input optical signal.

13. The system of claim 12 further comprising a processing unit operatively connected to said optical receiver, said processing unit being configured to derive spectral phase differences between said input spectral peaks of said input optical signals using said output spectral peaks.

14. The system of claim 13 wherein said optical signal generator includes an optical local oscillator source to generate a local oscillator signal and an optical modulator to modulate said local oscillator optical signal, said optical modulator including one of an intensity modulator and a phase modulator.

15. The system of claim 14 wherein said phase modulator is configured to optically modulate said local oscillator signal such that the frequency separation between said central spectral peak and said side spectral peak is approximately equal to an integer times half of the frequency separation of said input spectral peaks of said input optical signal.

16. The system of claim 15 wherein said optical signal generator includes a modulation controller operatively connected to said phase modulator, said modulation controller being configured to shift the phase of an electrical modulation signal applied to said phase modulator to phase modulate said local oscillator signal such that amplitudes of said output spectral peaks are changed.

17. The system of claim 16 wherein said processing unit includes a computer that is configured to compute said spectral phase differences between said input spectral peaks of said input optical signal using said output spectral peaks produced by a shift of said phase of said electrical modulation signal.

18. The system of claim 14 wherein said optical signal generator includes a modulation controller operatively connected to said phase modulator, said modulation controller being configured to modulate the phase of an electrical signal applied to said phase modulator to phase modulate said local oscillator signal.

19. The system of claim 18 wherein said processing unit includes a phase sensitive detector to measure amplitudes of different harmonics of the frequency of said electrical signal.

20. The system of claim 19 wherein said processing unit further includes a processor operatively connected to said phase sensitive detector, said processor being configured to compute said spectral phase differences between said input spectral peaks of said input optical signal using said amplitudes of even and odd harmonics of said frequency of said electrical signal.

21. The system of claim 14 wherein said phase modulator is configured to optical modulate said local oscillator signal such that the frequency separation between said central spectral peak and said side spectral peak is equal to an integer times half of the frequency separation of said input spectral peaks of said input optical signal offset by a reference frequency.

22. The system of claim 21 wherein said processing unit includes a phase sensitive detector to compare said output spectral peaks with a reference signal having said reference frequency to measure said spectral phase differences of said input spectral peaks of said input optical signal.

23. A method for analyzing optical properties of optical signals comprising:
receiving an input optical signal having input spectral peaks at different frequencies;
providing a local oscillator signal;
combining and mixing said input optical signal and said local oscillator optical signal to produce a heterodyne signal; and
electrically mixing said heterodyne signal with an electrical signal to produce a mixed electrical signal having output spectral peaks that include combinations of said input spectral peaks of said input optical signal.

24. The method of claim 23 further comprising comparing said mixed electrical signal with a reference signal to measure spectral phase differences between said input spectral peaks of said input optical signal.

25. The method of claim 23 further comprising reconstructing said input spectral peaks of said input optical signal from said output spectral peaks.

26. The method of claim 23 wherein said reference signal has a frequency defined by a frequency separation of said input spectral peaks of said input optical signal and the frequency of said electrical signal.

27. An optical analyzer system comprising:
- an input to receive an input optical signal having input spectral peaks at different frequencies;
- a local oscillator configured to generate a local oscillator signal;
- an optical coupler configured to combine said input optical signal and said local oscillator optical signal;
- an optical receiver configured to receive and mix said input optical signal and said local oscillator optical signal to produce a heterodyne signal; and
- a mixer configured to mix said heterodyne signal with an electrical signal to produce a mixed electrical signal having output spectral peaks that include combinations of said input spectral peaks of said input optical signal.

28. The system of claim 27 further comprising a phase sensitive detector configured to compare said mixed electrical signal with a reference signal to measure phase differences between said spectral peaks of said input optical signal.

29. The system of claim 27 further comprising a calculator that is configured to reconstruct said input spectral peaks of said input optical signal from said output spectral peaks of said mixed electrical signal.

30. The system of claim 27 wherein said reference signal has a frequency defined by a frequency separation of said input spectral peaks of said input optical signal and the frequency of said electrical signal.

* * * * *